(12) United States Patent
Shriwas et al.

(10) Patent No.: US 12,158,915 B2
(45) Date of Patent: Dec. 3, 2024

(54) CONSTRAINT MANAGEMENT SYSTEM AND METHOD FOR CLASSIFIER BASED CONSTRAINT MANAGEMENT

(71) Applicant: Rakuten Mobile, Inc., Tokyo (JP)

(72) Inventors: Pawan Shriwas, Indore (IN); Apurva Tripathi, Indore (IN); Ayush Kumar Singh, Indore (IN); Pankaj Pachori, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/011,526

(22) PCT Filed: Nov. 9, 2022

(86) PCT No.: PCT/US2022/049344
§ 371 (c)(1),
(2) Date: Dec. 20, 2022

(87) PCT Pub. No.: WO2024/030143
PCT Pub. Date: Feb. 8, 2024

(65) Prior Publication Data
US 2024/0303275 A1  Sep. 12, 2024

(30) Foreign Application Priority Data
Aug. 5, 2022  (IN) .............................. 202241044876

(51) Int. Cl.
G06F 16/20  (2019.01)
G06F 16/23  (2019.01)
G06F 16/901  (2019.01)

(52) U.S. Cl.
CPC ...... *G06F 16/9024* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 6,704,747 B1 * | 3/2004 | Fong | ...................... | G06F 16/252 |
| 6,826,523 B1 * | 11/2004 | Guy | ...................... | A63F 13/352 |
| | | | | 709/227 |
| 9,584,949 B2 * | 2/2017 | Korovin | .................. | H04W 4/60 |

(Continued)

*Primary Examiner* — Belix M Ortiz Ditren
(74) *Attorney, Agent, or Firm* — HAUPTMAN HAM, LLP

(57) ABSTRACT

Embodiment herein provides a method for classifier based constraint management. The method comprises creating a constraint graph database comprising a plurality of constraint classes associated with a plurality of Application program interfaces (APIs); receiving a request to perform at least one operation associated with at least one entity; determining at least one constraint class from the plurality of constraint classes based on the information about the at least one entity to perform the at least one operation; invoking the at least one API from the plurality of APIs based on the at least one constraint class to access the plurality of constraints associated with the at least one constraint class; and performing the at least one operation associated with the at least one entity based on the plurality of constraints associated with the at least one constraint class and the information about the at least one entity.

21 Claims, 7 Drawing Sheets

(56) References Cited

U.S. PATENT DOCUMENTS

| | | | |
|---|---|---|---|
| 2006/0123370 A1* | 6/2006 | Vergara-Escobar | ........................ G06F 30/3312 716/108 |
| 2007/0169036 A1* | 7/2007 | Garner | .................... G06F 8/437 717/136 |
| 2008/0084890 A1* | 4/2008 | Kompella | ............... H04L 45/02 370/400 |
| 2016/0274869 A1* | 9/2016 | Wolf | ......................... G06F 8/30 |
| 2019/0103107 A1* | 4/2019 | Cohen | ................... G06F 16/908 |
| 2023/0043276 A1* | 2/2023 | Li | ............................. G06N 5/00 |

\* cited by examiner

CONSTRAINT MANAGEMENT SYSTEM AND METHOD FOR CLASSIFIER BASED CONSTRAINT MANAGEMENT

PRIORITY CLAIM AND CROSS-REFERENCE

The present application is a National Phase of International Application No. PCT/US2022/049344, filed Nov. 9, 2022, which claims priority to Indian Patent Application No. 202241044876 filed 5 Aug. 2022, which is hereby incorporated by reference in its entirety.

FIELD OF INVENTION

The present invention relates to inventory management and more specifically related to a constraint management system and method for classifier based constraint management.

BACKGROUND

In general, inventories of large organizations are maintained using graph databases where various entities are created to represent various departments or elements of the large organizations. Each entity created within the graph database includes properties such as a label defined between entities, characteristics of the entities, relationship between the entities, etc. which may be defined on a global level within the graph databases. One or more properties of the entity is defined by a user at a time of creation of an entity. However, there is no check performed to determine if there are any duplication or repetition with respect to the properties of the entity. As a result, an admin or a supervisor will have to specifically look into the property of various entities which is a very consuming and cumbersome process. Also, when handling inventories of the large organizations multiple human resources may have to be deployed to check the fulfillment of type value for the property of the various entities which may increase cost of the human resources in large organizations. Also, the same human resource could be used to perform other tasks. Thus, it is desired to address the aforementioned disadvantages or other shortcomings or at least provide a useful alternative.

OBJECT OF INVENTION

The principal object of the embodiments herein is to provide a constraint management system and a method for classifier based constraint management in a graph database. The proposed method operates at a validation layer of a graph database and hence if one or more constraints specified by the constraint management system are not satisfied then the entities are not created. Therefore, the proposed method helps in saving memory as well as processing capacity of the constraint management system without creating the entities when the one or more constraints are not satisfied.

SUMMARY

Accordingly, the embodiment herein is to provide a method for classifier based constraint management, where the method includes: creating, by a constraint management system, a constraint graph database that includes a plurality of constraint classes associated with a plurality of Application program interfaces (APIs), where each constraint class of the plurality of constraint classes includes a plurality of constraints associated with at least one API from the plurality of APIs to access the plurality of constraints; receiving, by the constraint management system, a request to perform at least one operation associated with at least one entity, where the request includes information about the at least one entity to constraint the at least one operation; determining, by the constraint management system, at least one constraint class from the plurality of constraint classes based on the information about the at least one entity to perform the at least one operation; invoking, by the constraint management system, the at least one API from the plurality of APIs based on the at least one constraint class to access the plurality of constraints associated with the at least one constraint class; and performing, by the constraint management system, the at least one operation associated with the at least one entity based on the plurality of constraints associated with the at least one constraint class and the information about the at least one entity.

Accordingly, the embodiments herein provide a constraint management system for classifier based constraint management, where the constraint management system includes: a constraint graph database; a constraint database that includes a plurality of constraints, where the plurality of constraints includes at least one of uniqueness constraints, a relationship constraints, and a value constraints; and a plurality of constraint management servers configured to manage the plurality of constraints, where the plurality of constraint management servers includes at least one of an uniqueness constraint management server, a relationship constraint management server, and a value constraint management server; characterized in that a constraint management controller connected to a plurality of Application program interfaces (APIs) to access the plurality of constraints from the constraint database, where the constraint management controller is configured to: create a constraint graph database that includes a plurality of constraint classes associated with a plurality of Application program interfaces (APIs), where each constraint class of the plurality of constraint classes includes a plurality of constraints associated with at least one API from the plurality of APIs to access the plurality of constraints; receive a request to perform at least one operation associated with at least one entity, where the request includes information about the at least one entity to constraint the at least one operation; determine at least one constraint class from the plurality of constraint classes based on the information about the at least one entity to perform the at least one operation; invoke the at least one API from the plurality of APIs based on the at least one constraint class to access the plurality of constraints associated with the at least one constraint class; and perform the at least one operation associated with the at least one entity based on the plurality of constraints associated with the at least one constraint class and the information about the at least one entity.

Accordingly, the embodiments herein provide a computer program product (CPP) for classifier based constraint management. The CPP comprises a computer executable program code recorded on a computer readable non-transitory storage medium, where said computer executable program code when executed causing the actions including: creating a constraint graph database that includes a plurality of constraint classes associated with a plurality of Application program interfaces (APIs), where each constraint class of the plurality of constraint classes includes a plurality of constraints associated with at least one API from the plurality of APIs to access the plurality of constraints; receiving a request to perform at least one operation associated with at least one entity, where the request includes information about the at least one entity to constraint the at least one operation; determining at least one constraint class from the plurality of constraint classes based on the information about the at least one entity to perform the at least one operation; invoking the at least one API from the plurality of APIs based on the at least one constraint class to access the plurality of constraints associated with the at least one constraint class; and performing the at least one operation associated with the at least one entity based on the plurality of constraints associated with the at least one constraint class and the information about the at least one entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
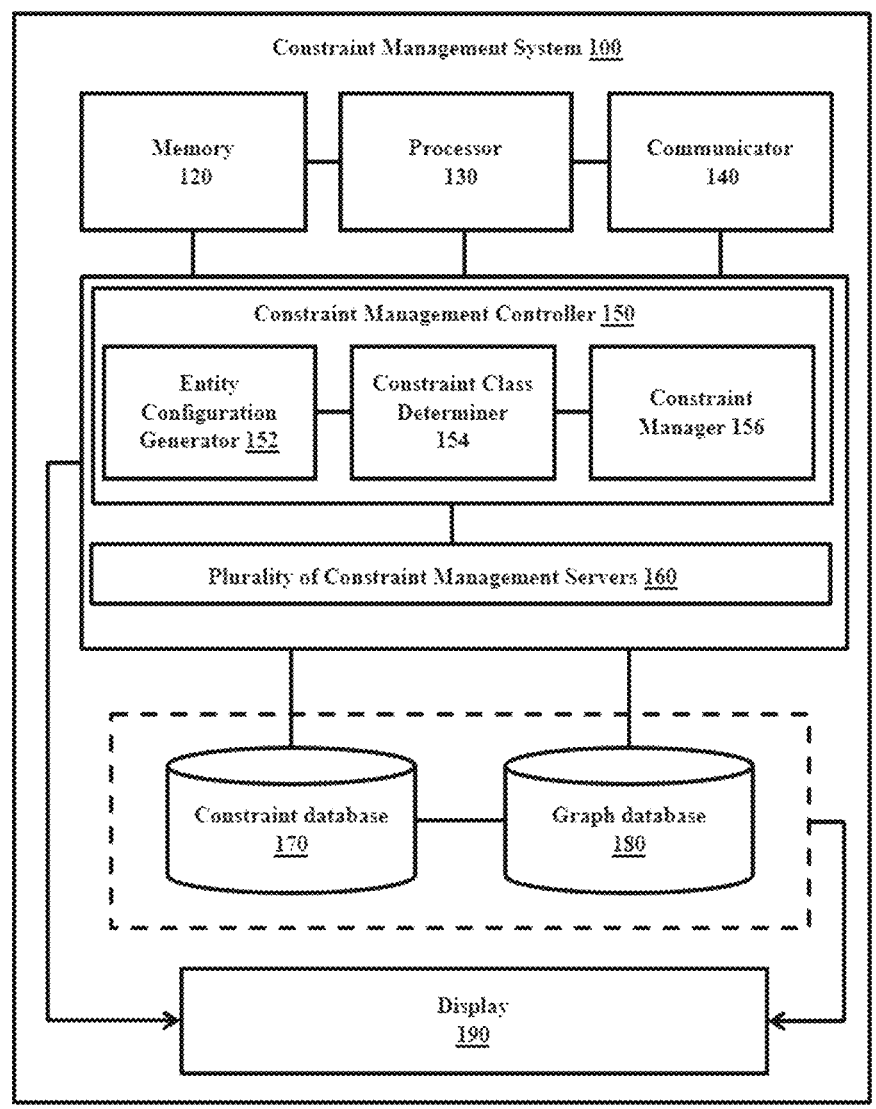
FIG. 1 is a block diagram of a constraint management system for managing constraints and classifying the constraints in a graph database, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As it is traditional in the field, the embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for classifier based constraint management, where the method includes: creating, by a constraint management system, a constraint graph database that includes a plurality of constraint classes associated with a plurality of Application program interfaces (APIs), where each constraint class of the plurality of constraint classes includes a plurality of constraints associated with at least one API from the plurality of APIs to access the plurality of constraints; receiving, by the constraint management system, a request to perform at least one operation associated with at least one entity, where the request includes information about the at least one entity to constraint the at least one operation; determining, by the constraint management system, at least one constraint class from the plurality of constraint classes based on the information about the at least one entity to perform the at least one operation; invoking, by the constraint management system, the at least one API from the plurality of APIs based on the at least one constraint class to access the plurality of constraints associated with the at least one constraint class; and performing, by the constraint management system, the at least one operation associated with the at least one entity based on the plurality of constraints associated with the at least one constraint class and the information about the at least one entity.

Accordingly, the embodiments herein provide a constraint management system for classifier based constraint management, where the constraint management system includes: a constraint graph database; a constraint database that includes a plurality of constraints, where the plurality of constraints includes at least one of uniqueness constraints, a relationship constraints, and a value constraints; and a plurality of constraint management servers configured to manage the plurality of constraints, where the plurality of constraint management servers includes at least one of an uniqueness constraint management server, a relationship constraint management server, and a value constraint management server; characterized in that a constraint management controller connected to a plurality of Application program interfaces (APIs) to access the plurality of constraints from the constraint database, where the constraint management controller is configured to: create a constraint graph database including a plurality of constraint classes associated with a plurality of Application program interfaces (APIs), where each constraint class of the plurality of constraint classes includes a plurality of constraints associated with at least one API from the plurality of APIs to access the plurality of constraints; receive a request to perform at least one operation associated with at least one entity, where the request includes information about the at least one entity to constraint the at least one operation; determine at least one constraint class from the plurality of constraint classes based on the information about the at least one entity to perform the at least one operation; invoke the at least one API from the plurality of APIs based on the at least one constraint class to access the plurality of constraints associated with the at least one constraint class; and perform the at least one operation associated with the at least one entity based on the plurality of constraints associated with the at least one constraint class and the information about the at least one entity.

Accordingly, the embodiments herein provide a computer program product (CPP) for classifier based constraint management. The CPP includes a computer executable program code recorded on a computer readable non-transitory storage medium, where said computer executable program code when executed causing the actions including: creating a constraint graph database including a plurality of constraint classes associated with a plurality of Application program interfaces (APIs), where each constraint class of the plurality of constraint classes includes a plurality of constraints associated with at least one API from the plurality of APIs to access the plurality of constraints; receiving a request to perform at least one operation associated with at least one entity, where the request includes information about the at least one entity to constraint the at least one operation; determining at least one constraint class from the plurality of constraint classes based on the information about the at least one entity to perform the at least one operation; invoking the at least one API from the plurality of APIs based on the at least one constraint class to access the plurality of constraints associated with the at least one constraint class; and performing the at least one operation associated with the at least one entity based on the plurality of constraints associated with the at least one constraint class and the information about the at least one entity.

Referring now to the drawings and more particularly to FIGS. 1 through 7, where similar reference characters denote corresponding features consistently throughout the figures, there are shown preferred embodiments.

FIG. 1 is a block diagram of a constraint management system (100) for managing constraints and classifying the constraints in a graph database, according to an embodiment as disclosed herein.

In an embodiment, the constraint management system (100) includes a memory (120), a processor (130), a communicator (140), a constraint management controller (150), a plurality of constraint management servers (160), a constraint database (170), a graph database (180), and a display (190). The constraint management system (100) operates in a validation layer of the graph database (180).

The memory (120) is configured to store instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (130) communicates with the memory (120), the communicator (140), and the management controller (150). The processor (130) is configured to execute instructions stored in the memory (120) and to perform various processes. The processor (130) may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (140) includes an electronic circuit specific to a standard that enables wired or wireless communication. The communicator (140) is configured to communicate internally between internal hardware components of the constraint management system (100) and with external devices via one or more networks.

In an embodiment, the constraint database (170) includes a plurality of constraint classes associated with a plurality of Application program interfaces (APIs). Each constraint class of the plurality of constraint classes includes a plurality of constraints associated with at least one API from the plurality of APIs to access the plurality of constraints. In one embodiment, the plurality of constraint classes can be uniqueness constraints, and relationship constraints.

In an embodiment, the constraint management controller (150) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The constraint management controller (150) includes an entity configuration generator (152), a constraint class determiner (154), and a constraint manager (156).

In an embodiment, the entity configuration generator (152) is configured to receive a request to perform an operation associated with an entity in the graph database (180). The request includes information about the entity to constraint the operation. The information about the entity includes properties of the entity.

The operation associated with the entity includes one of a create operation to create the entity, an update operation to update the entity, a delete operation to delete the entity, a configure operation to configure the entity, an apply operation to the entity, a commit operation to commit the entity, and a rollback operation to roll back the entity. Table. 1 provides a list of operations.

TABLE 1

| Function | Prototype | Description |
| --- | --- | --- |
| Create | create(constraintSpec) | Create a spec |
| Get | get(id) | Get a spec by id |
| Get | getList(query) | Get a list of specs by query |
| Update | update(constraintSpec) | Update a spec |
| Delete | delete(constraintSpec) | Delete a spec |
| Configure | configure(constraintSpec) | Configure a spec |
| Unconfigure | unconfigure(constraintSpec) | Unconfigure a spec |
| Apply | apply(object, specidlist) | Apply a list of specs |
| Reapply | reapply(object, specidlist) | Reapply constraints for when an object is modified. |
| Unapply | unapply(object, specidlist) | Unapply constraints for when an object is deleted. |
| Confirm | confirm(object) | Commit pending constraints on objet |
| Cancel | cancel(object) | Cancel any pending constraints (rollback) |

The entity configuration generator (152) is configured to generate an entity configuration file based on the information about the entity to perform the operation. In one embodiment, the entity configuration file generated includes a constraint type, a constraint field, a constraint scope, a constraint name, a constraint type, a constraint when, a constraint expression, and a constraint data.

An example entity configuration file includes following:
constraintType: unique
constraintFields: name
constraintData: Router_name_cons
constraintName: unique_Router_Constraint_unique1
constraint expression: */? (only in relationship)

In an embodiment, the constraint class determiner (154) is configured to determine one constraint class from a plurality of constraint classes in the constraint database (170) based on the information about the entity to perform the operation.

In an embodiment, the constraint manager (156) is configured to invoke one API from the plurality of APIs based on the constraint class to access the plurality of constraints associated with the constraint class, and perform the operation associated with the entity based on the plurality of constraints associated with the constraint classes and the information about the entity.

In one embodiment, in order to perform the one operation associated with the entity, the constraint manager (156) is configured to create a constraint specification based on the plurality of constraints associated with the constraint class. The constraint manager (156) is also configured to invoke a constraint handler corresponding to the constraint specification to perform the operation. The constraint handler includes one of a uniqueness constraint handler, a relationship constraint handler, and a value constraint handler. The constraint manager (156) is also configured to create an object corresponding to the operation using the constraint handler. The constraint manager (156) is also configured to validate the information about the entity by applying the constraint specification on the object corresponding to the operation and perform the operation associated with the entity upon successful validation of the information about the entity.

In an embodiment, the graph database (180) is configured to store the entities as and when the entities are created. In an embodiment, the constraint database (170) and the graph database (180) may be separate elements located within the constraint management system (100). In another embodiment, the constraint database (170) and the graph database (180) may be a single element located within the constraint management system (100) (indicated by dotted lines in the FIG. 1). The constraint(s) database (170) and the graph database (180) may be located within the memory (120) or out of the memory (120) of the constraint management system (100).

At least one of the plurality of modules/components of the constraint management controller (150) may be implemented through an AI model. A function associated with the AI model may be performed through memory (120) and the processor (130). The one or a plurality of processors controls the processing of the input data in accordance with a predefined operating rule or the AI model stored in the non-volatile memory and the volatile memory. The predefined operating rule or artificial intelligence model is provided through training or learning.

In an embodiment, the display (190) is configured to display a user interface (UI). The display (190) can receive inputs, and is made of one of liquid crystal display (LCD), light emitting diode (LED), organic light-emitting diode (OLED), etc. The user inputs may be provided as for example but not limited to touch, swipe, drag, gesture, voice command, etc.

Although the FIG. 1 shows various hardware components of the constraint management system (100), but it is to be understood that other embodiments are not limited thereon. In other embodiments, the constraint management system (100) may include less or a greater number of components. Further, the labels or names of the components are used only for illustrative purpose and does not limit the scope of the invention. One or more components can be combined to perform same or substantially similar function to manage the constraints associated with the entities in the graph database (180).

Figure 2:
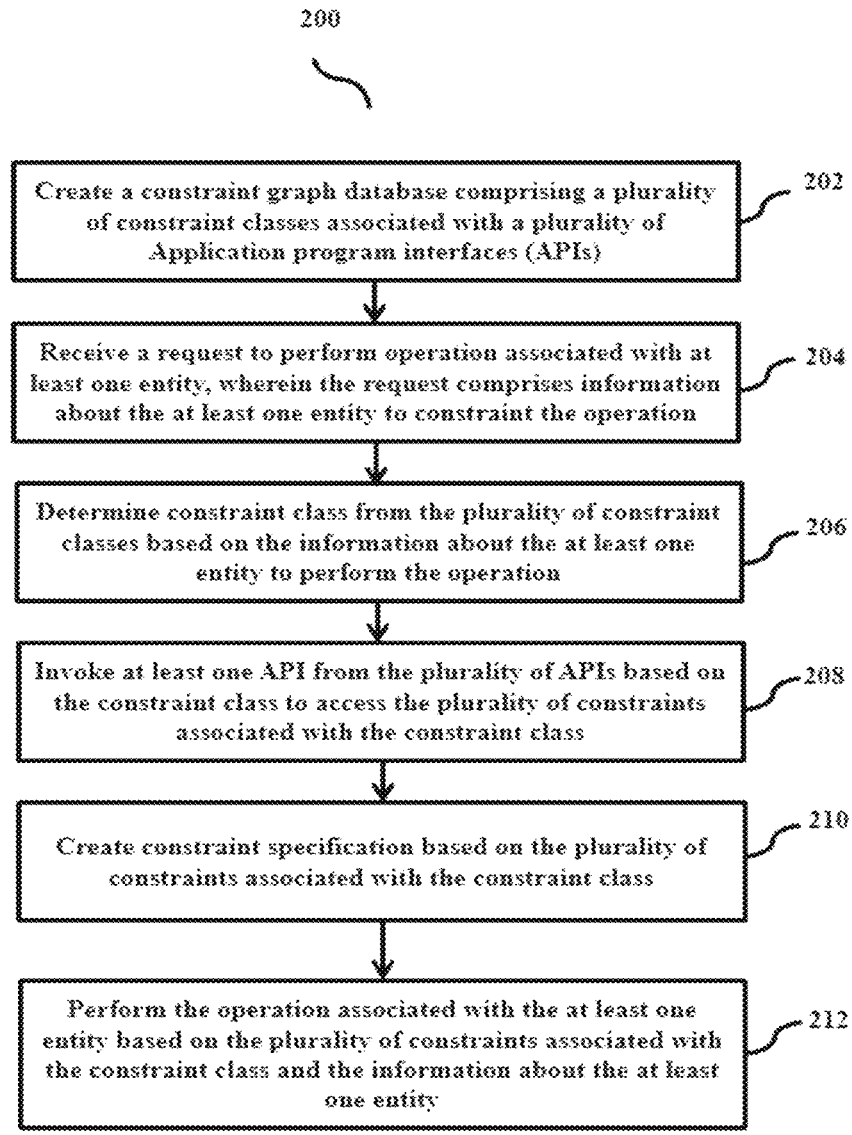
FIG. 2 is a flow chart illustrating a method for managing the constraints and classifying the constraints in the graph database, according to an embodiment as disclosed herein.

FIG. 2 is a flow chart (200) illustrating a method for managing the constraints and classifying the constraints in the graph database (180), according to an embodiment as disclosed herein.

Referring to the FIG. 2, at step 202, the method includes the constraint management system (100) creating the constraint database (170) including the plurality of constraint classes associated with the plurality of APIs. Each constraint class of the plurality of constraint classes includes a plurality of constraints associated with one API from the plurality of APIs to access the plurality of constraints.

At step 204, the method includes the constraint management system (100) receiving the request to perform the operation associated with an entity. The request includes information about the entity to constraint the operation. The at least one operation associated with the at least one entity includes at least one of a create operation to create the at least one entity, an update operation to update the at least one entity, a delete operation to delete the at least one entity, a configure operation to configure the at least one entity, an apply operation to the at least one entity, a commit operation to commit the at least one entity, and a rollback operation to roll back the at least one entity.

At step 206, the method includes the constraint management system (100) determining at least one constraint class from the plurality of constraint classes based on the information about the at least one entity to perform the at least one operation. In one embodiment, determining, the at least one constraint class from the plurality of constraint classes based on the information about the at least one entity to perform the at least one operation includes generating an entity configuration file based on the information about the at least one entity to perform the at least one operation, The entity configuration file includes a constraint type, a constraint field, and a constraint scope, a constraint name, a constraint type, a constraint when, a constraint field, a constraint expression, and constraint data. The method includes determining the at least one constraint class from the plurality of constraint classes based on the entity configuration file.

At step 208, the method includes the constraint management system (100) invoking the at least one API from the plurality of APIs based on the at least one constraint class to access the plurality of constraints associated with the at least one constraint class.

At step 210, the method includes the constraint management system (100) creating constraint specification based on the plurality of constraints associated with the at least one constraint class.

At step 212, the method includes the constraint management system (100) performing the at least one operation associated with the at least one entity based on the plurality of constraints associated with the at least one constraint class and the information about the at least one entity. In one embodiment, performing the at least one operation associated with the at least one entity based on the plurality of constraints associated with the at least one constraint class includes: invoking at least one constraint handler corresponding to the constraint specification to perform the one or more operation. The at least one constraint handler includes at least one of a uniqueness constraint handler, a relationship constraint handler, and a value constraint handler; creating at least one object corresponding to the at least one operation using the at least one constraint handler; validating the information about the at least one entity by applying the constraint specification on the at least one object corresponding to the at least one operation; and performing the at least one operation associated with the at least one entity upon successful validation of the information about the at least one entity.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
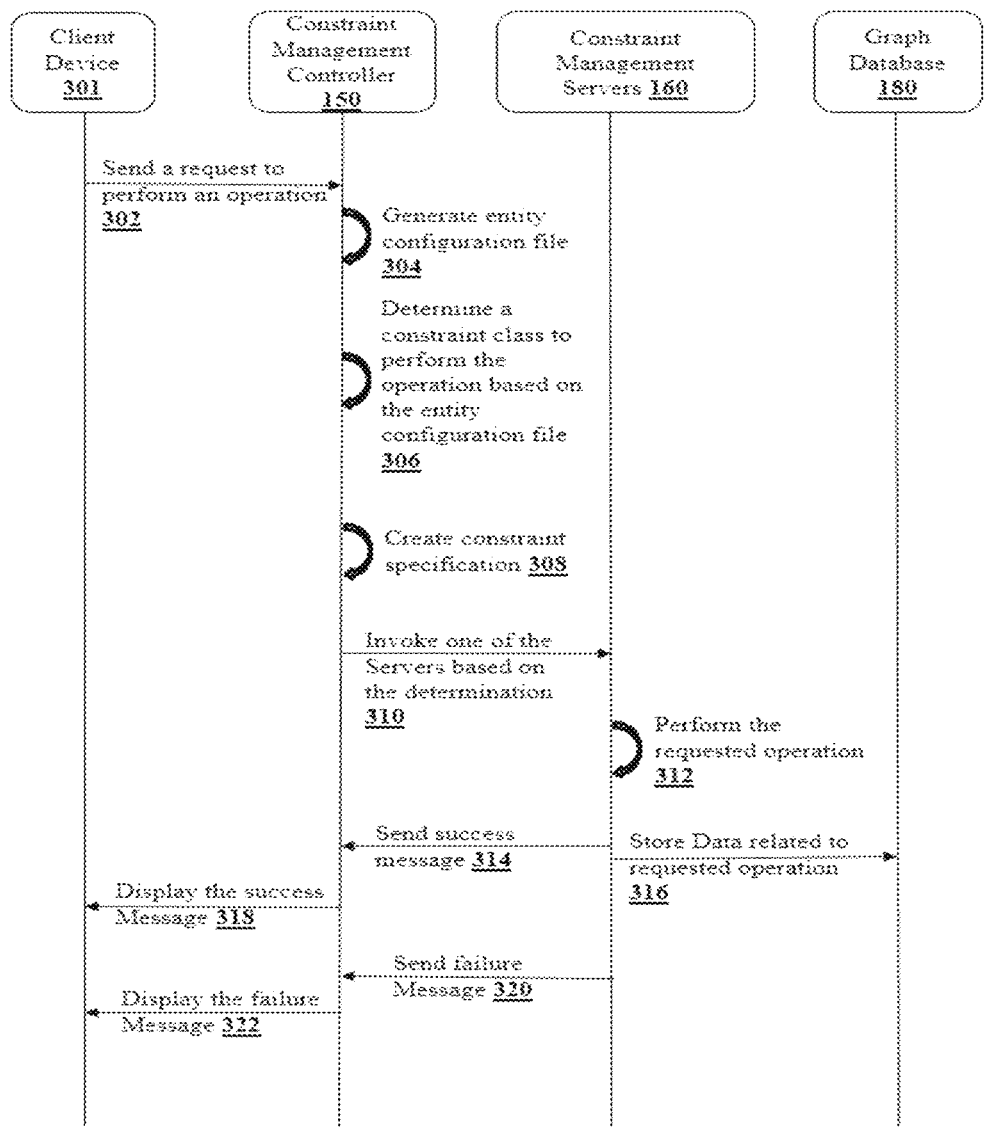
FIG. 3 illustrates step-by-step process for managing the constraints and classifying the constraints in the graph database, according to an embodiment as disclosed herein.

FIG. 3 illustrates step-by-step process for managing the constraints and classifying the constraints in the graph database, according to an embodiment as disclosed herein.

Referring to the FIG. 3, at step 302, a client device 301 sends a request to perform an operation. The request includes information about the entity to constraint the operation. The information about the entity includes properties of the entity. The operation associated with the entity includes one of a create operation to create the entity, an update operation to update the entity, a delete operation to delete the entity, a configure operation to configure the entity, an apply operation to the entity, a commit operation to commit the entity, and a rollback operation to roll back the entity.

At step 304, the constraint management controller (150) generates the entity configuration file. The entity configuration generator (152) of the constraint management controller (150) is configured to generate an entity configuration file based on the information about the entity to perform the operation. In one embodiment, the entity configuration file generated includes a constraint type, a constraint field, a constraint scope, a constraint name, a constraint type, a constraint when, a constraint expression, and a constraint data.

At step 306, the constraint class to perform the operation is determined based on the entity configuration file. In one embodiment, the constraint management controller (150) is configured to determine one constraint class from a plurality of constraint classes in the constraint database (170) based on the information about the entity to perform the operation.

At step 308, a constraint specification is created. In one embodiment, the constraint specification is created based on the plurality of constraints associated with the determined at least one constraint class.

At step 310, one of the plurality of constraint management servers (160) is invoked. In one embodiment, one API from the plurality of APIs is invoked to access the corresponding server based on the constraint class to access the plurality of constraints associated with the constraint class.

At step 312, the requested operation is performed. In one embodiment, the constraint management controller (150) is configured to invoke a constraint handler corresponding to the constraint specification to perform the operation, The constraint handler includes one of a uniqueness constraint handler, the relationship constraint handler, and a value constraint handler. The constraint manager (156) is also configured to create an object corresponding to the operation using the constraint handler. The constraint manager (156) is also configured to validate the information about the entity by applying the constraint specification on the object corresponding to the operation and perform the operation associated with the entity upon successful validation of the information about the entity.

At step 314, the selected server of the plurality of constraint management servers (160) sends a success message to the constraint management controller (150) when the operation is successfully performed.

At step 316, data related to the requested operation is stored in the graph database (180) after the operation is successfully performed.

At step 318, the success message is displayed on the client device (102) after the operation is successfully performed.

At step 320, the selected server of the plurality of constraint management servers (160) send a failure message to the constraint management controller (150) when the operation is not successfully performed.

At step 322, the failure message is displayed on the client device (301) when the operation is not performed.

Figure 4:
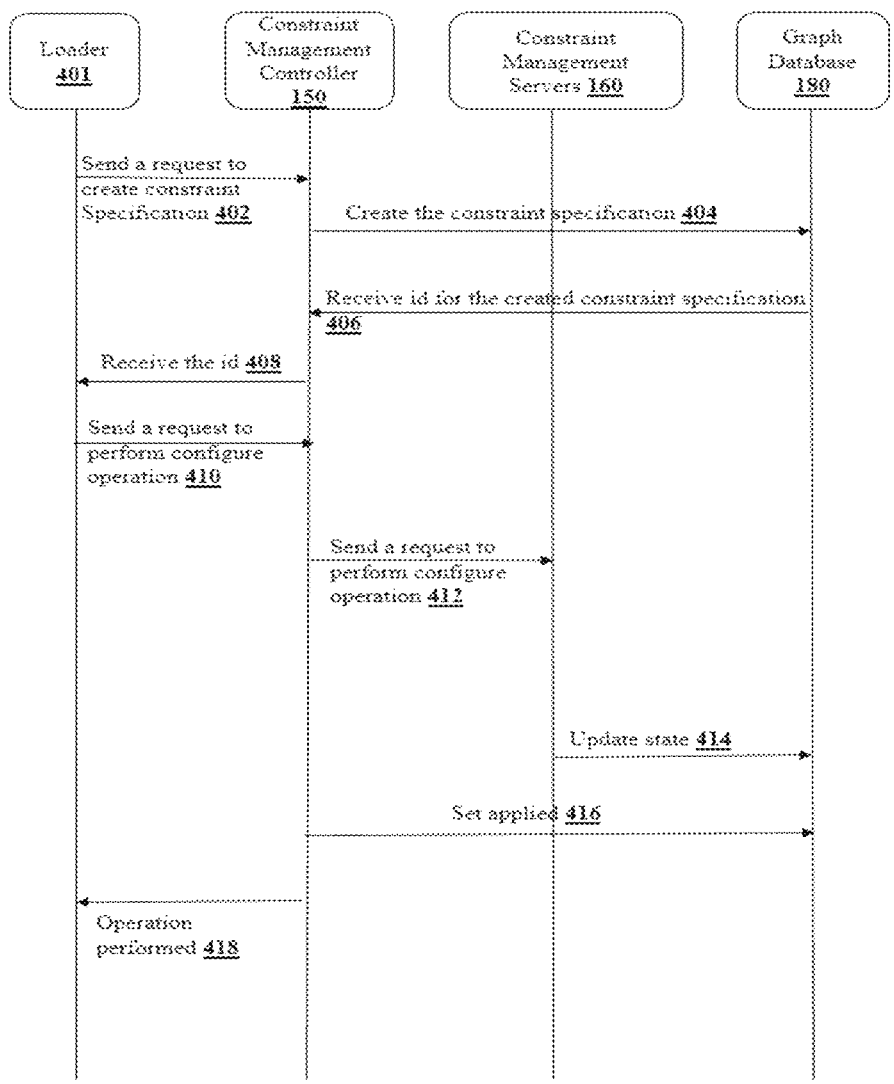
FIG. 4 illustrates step-by-step process for creating constraint specification in the graph database to perform the constraint management, according to an embodiment as disclosed herein.

FIG. 4 illustrates step-by-step process for creating constraint specification in the graph database to perform the constraint management, according to an embodiment as disclosed herein.

Referring to the FIG. 4, at step 402, a request to create constraint specification is sent from a loader 500. In an embodiment, the loader 500 can be YANG loader.

At step 404, the constraint management controller (150) sends a request to create the constraint specification and store the created constraint specification in the graph database (180).

At step 406, the graph database (180) sends a unique identity (id) for the constraint specification created. The id is used to retrieve the constraint specification when performing one or more operations in future.

At step 408, the unique id received by the constraint management controller (150) is sent to the loader (500).

At step 410, the loader (500) sends a request to perform a configure operation for the constraint specification created.

At step 412, the constraint management controller (150) sends the request to perform the configure operation.

At step 414, the one of the plurality of constraint management servers (160) perform the operation and update the constraint specification.

At step 416, the constraint management controller (150) perform a set applied. In one embodiment, the constraint management controller (150) perform the set applied to mark the entity specification as 'Applied or Active'.

At step 418, the constraint management controller (150) sends a confirmation message to the loader (500) when the configure operation is performed.

Figure 5:
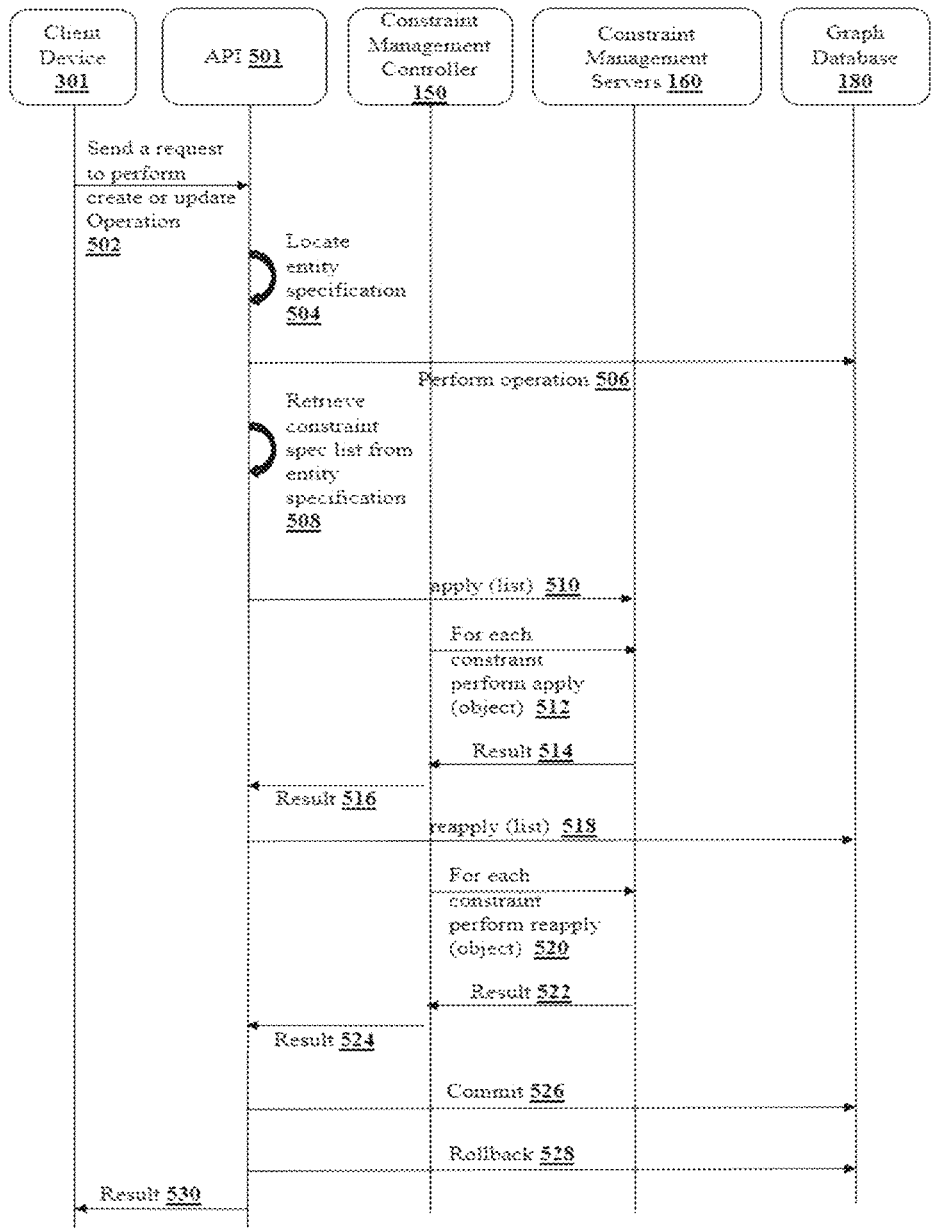
FIG. 5 illustrates step-by-step process of performing the constraint management for create and update operation for one or more entities, according to an embodiment as disclosed herein.

FIG. 5 illustrates step-by-step process of performing the constraint management for create and update operation for one or more entities, according to an embodiment as disclosed herein.

Referring to the FIG. 5, at step 502, a request to perform the create or the update operation is sent. In one embodiment, an object for the entity is to be created in a transaction, and the validation is to be performed in the same transaction in order to see the to-be view of the data for resolving any relationships for scope traversals.

At step 504, the API (501) locates an entity specification for performing the create or the update operation.

At step 506, the API (501) performs the operation to retrieve constraint specification list from the entity specification.

At step 508, the constraint specification list corresponding to the entity specification is retrieved.

At step 510, the apply operation is sent from the API (501) to the plurality of constraint management server (160).

At step 512, the constraint management controller (150) sends a request to perform the apply operation for each object.

At step 514, upon the completion of the operation, one of the plurality of constraint management sever (160) sends a result to the constraint management controller (150).

At step 516, the constraint management controller (150) sends a result of the apply operation to the API (501).

At step 518, the reapply operation is send from the API (501) to the plurality of constraint management server (160).

At step 520, the constraint management controller (150) sends a request to perform the reapply operation for each object.

At step 522, upon the completion of the operation, the constraint management sever (160) sends a result to the constraint management controller (150).

At step 524, the constraint management controller (150) sends a result of the apply operation to the API (501).

At step 526, the API (501) sends a request to perform the commit operation.

At step 528, the API (501) sends a request to perform the rollback operation.

At step 530, the API (501) sends a result to the client device (301).

Figure 6:
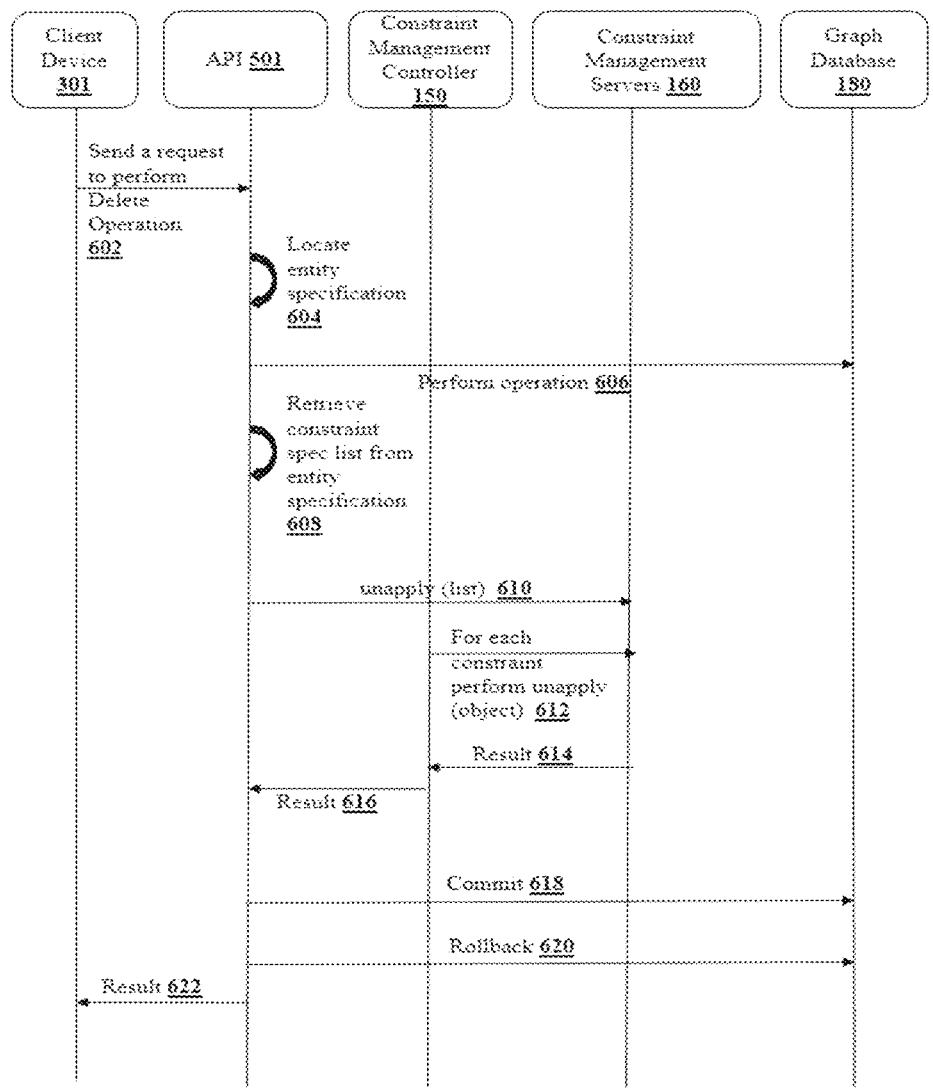
FIG. 6 illustrates step-by-step process of performing the constraint management for delete operation on the one or more entities created, according to an embodiment as disclosed herein.

FIG. 6 illustrates step-by-step process of performing constraint management for delete operation on the one or more entities created, according to an embodiment as disclosed herein.

Referring to the FIG. 6, at step 602, a request to perform the delete operation on the one or more entities created is sent.

At step 604, the API (501) locates the entity specification for performing the delete operation.

At step 606, the API (501) performs the operation to locate an entity specification from the graph database (180).

At step 608, the constraint specification list corresponding to the entity specification is retrieved.

At step 610, a request to perform an unapply operation is send from the API (501) to one of the plurality of constraint management server (160).

At step 612, the constraint management controller (150) sends a request to perform the unapply operation for each object.

At step 614, upon completion of the unapply operation, the constraint management sever (160) sends a result of the unapply operation to the constraint management controller (150).

At step 616, the constraint management controller (150) sends a result of the unpply operation to the API (501).

At step 618, the API (501) sends a request to perform the commit operation.

At step 620, the API (501) sends a request to perform the rollback operation.

At step 622, the API (501) sends a result of the commit operation or the rollback operation.

Figure 7:
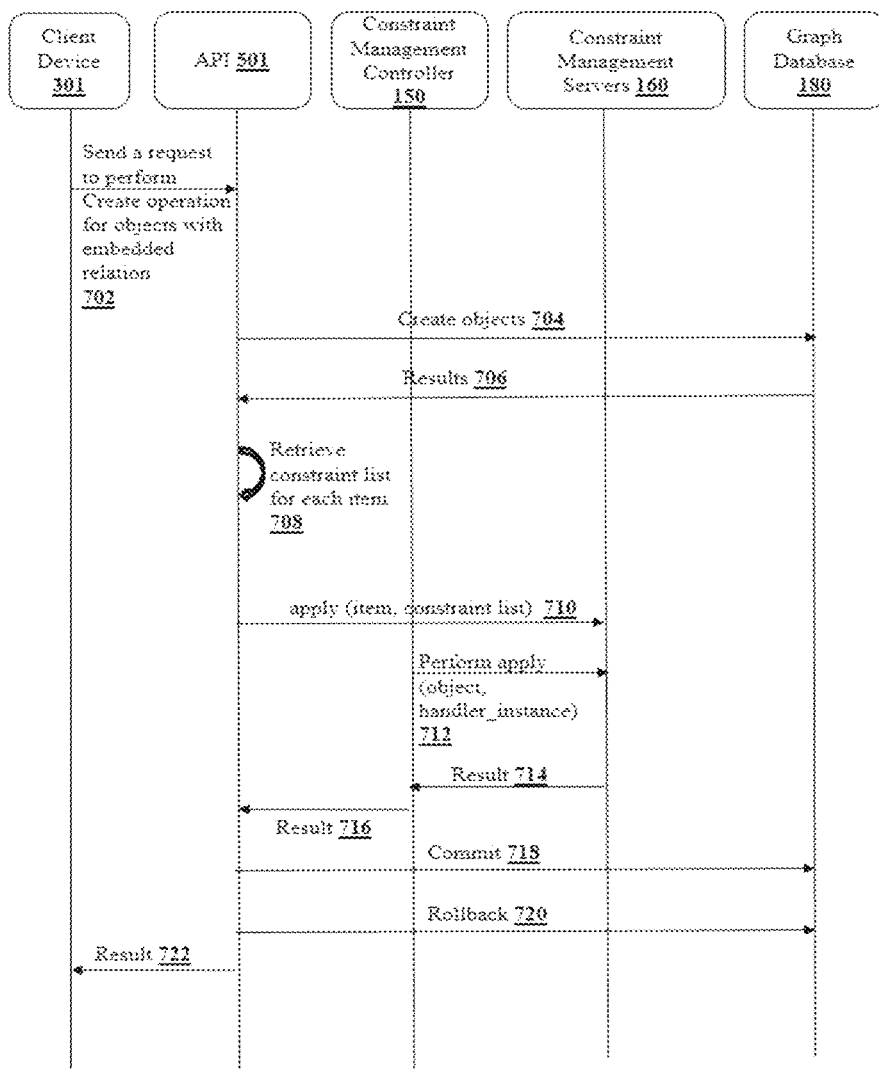
FIG. 7 illustrates step-by-step process of performing the constraint management on embedded related objects, according to an embodiment as disclosed herein.

FIG. 7 illustrates step-by-step process of performing the constraint management on embedded related objects, according to an embodiment as disclosed herein.

At step 702, a request to perform a create operation for objects with embedded relation is sent from the client device (301) to the API (501).

At step 704, one or more objects are created and stored in the graph database (180).

At step 706, a result regarding the creation of the one or more objects is sent from the graph database (180) to the API (501).

At step 708, a constraint list for each item in new object list is retrieved.

At step 710, the request to perform the apply operation for each item is sent including the constraint list.

At step 712, the request to perform the apply operation for each item using the handler instance.

At step 714, a result of the apply operation performed by one of the plurality of constraint management server (160) is sent to the constraint management controller (150).

At step 716, a result is sent from the constraint management controller (150) to the API (501).

At step 718, a request to perform a commit operation is sent when a validation is successful.

At step 720, a request to perform a rollback operation is sent when the validation is not successful.

At step 722, a result is sent from the API (501) to the client device (301).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:
1. A method for classifier based constraint management, wherein the method comprises:
   creating, by a constraint management system, a constraint graph database comprising a plurality of constraint classes associated with a plurality of Application program interfaces (APIs), wherein each constraint class of the plurality of constraint classes comprises a plurality of constraints associated with at least one API from the plurality of APIs to access the plurality of constraints;
   receiving, by the constraint management system, a request to perform at least one operation associated with at least one entity, wherein the request comprises information about the at least one entity to constraint the at least one operation;
   determining, by the constraint management system, at least one constraint class from the plurality of constraint classes based on the information about the at least one entity to perform the at least one operation;
   invoking, by the constraint management system, the at least one API from the plurality of APIs based on the at least one constraint class to access the plurality of constraints associated with the at least one constraint class; and
   performing, by the constraint management system, the at least one operation associated with the at least one entity based on the plurality of constraints associated with the at least one constraint class and the information about the at least one entity.

2. The method as claimed in claim 1, wherein the at least one operation associated with the at least one entity comprises at least one of a create operation to create the at least one entity, an update operation to update the at least one entity, a delete operation to delete the at least one entity, a configure operation to configure the at least one entity, an apply operation to the at least one entity, a commit operation to commit the at least one entity, and a rollback operation to roll back the at least one entity.

3. The method as claimed in claim 1, wherein determining, by the constraint management system, the at least one constraint class from the plurality of constraint classes based on the information about the at least one entity to perform the at least one operation comprises:
   generating, by the constraint management system, an entity configuration file based on the information about the at least one entity to perform the at least one operation, wherein the entity configuration file comprising a constraint type, a constraint field, and a constraint scope; and
   determining, by the constraint management system, the at least one constraint class from the plurality of constraint classes based on the entity configuration file.

4. The method as claimed in claim 3, wherein the entity configuration file further comprises a constraint name, a constraint type, a constraint when, a constraint expression, and constraint data.

5. The method as claimed in claim 1, wherein performing, by the constraint management system, the at least one operation associated with the at least one entity based on the plurality of constraints associated with the at least one constraint class comprises:
   creating, by the constraint management system, constraint specification based on the plurality of constraints associated with the at least one constraint class;
   invoking, by the constraint management system, at least one constraint handler corresponding to the constraint specification to perform the one or more operation, wherein the at least one constraint handler comprises at least one of a uniqueness constraint handler, a relationship constraint handler, and a value constraint handler;
   creating, by the constraint management system, at least one object corresponding to the at least one operation using the at least one constraint handler;
   validating, by the constraint management system, the information about the at least one entity by applying the constraint specification on the at least one object corresponding to the at least one operation; and
   performing, by the constraint management system, the at least one operation associated with the at least one entity upon successful validation of the information about the at least one entity.

6. The method as claimed in claim 1, wherein the plurality of constraints comprises at least one of uniqueness constraints, a relationship constraints, and a value constraints.

7. The method as claimed in claim 1, wherein the information about the at least one entity comprises properties associated with the at least one entity.

8. A constraint management system for classifier based constraint management, wherein the constraint management system comprises:
   a constraint graph database;
   a constraint database comprising a plurality of constraints, wherein the plurality of constraints comprises at least one of uniqueness constraints, a relationship constraints, and a value constraints; and
   a plurality of constraint management servers configured to manage the plurality of constraints, wherein the plurality of constraint management servers comprises at least one of an uniqueness constraint management server, a relationship constraint management server, and a value constraint management server;
characterized in that
   a constraint management controller connected to a plurality of Application program interfaces (APIs) to access the plurality of constraints from the constraint database, wherein the constraint management controller is configured to:
      create a constraint graph database comprising a plurality of constraint classes associated with a plurality of Application program interfaces (APIs), wherein each constraint class of the plurality of constraint classes comprises a plurality of constraints associated with at least one API from the plurality of APIs to access the plurality of constraints;
      receive a request to perform at least one operation associated with at least one entity, wherein the request comprises information about the at least one entity to constraint the at least one operation;
      determine at least one constraint class from the plurality of constraint classes based on the information about the at least one entity to perform the at least one operation;
      invoke the at least one API from the plurality of APIs based on the at least one constraint class to access the plurality of constraints associated with the at least one constraint class; and
      perform the at least one operation associated with the at least one entity based on the plurality of constraints associated with the at least one constraint class and the information about the at least one entity.

9. The constraint management system as claimed in claim 8, wherein the at least one operation associated with the at least one entity comprises at least one of a create operation to create the at least one entity, an update operation to update the at least one entity, a delete operation to delete the at least one entity, a configure operation to configure the at least one entity, an apply operation to the at least one entity, a commit operation to commit the at least one entity, and a rollback operation to roll back the at least one entity.

10. The constraint management system as claimed in claim 8, wherein to determine the at least one constraint class from the plurality of constraint classes based on the information about the at least one entity to perform the at least one operation, the constraint management controller is configured to:
   generate an entity configuration file based on the information about the at least one entity to perform the at least one operation, wherein the entity configuration file comprising a constraint name, a constraint type, a constraint field, and a constraint scope; and
   determine the at least one constraint class from the plurality of constraint classes based on the entity configuration file.

11. The constraint management system as claimed in claim 10, wherein the entity configuration file further comprises a constraint name, a constraint type, a constraint when, a constraint expression, and constraint data.

12. The constraint management system as claimed in claim 8, wherein to performing the at least one operation associated with the at least one entity based on the plurality of constraints associated with the at least one constraint class, the constraint management controller is configured to:
   create constraint specification based on the plurality of constraints associated with the at least one constraint class;
   invoke at least one constraint handler corresponding to the constraint specification to perform the one or more operation, wherein the at least one constraint handler comprises at least one of a uniqueness constraint handler, a relationship constraint handler, and a value constraint handler;
   create at least one object corresponding to the at least one operation using the at least one constraint handler;
   validate the information about the at least one entity by applying the constraint specification on the at least one object corresponding to the at least one operation; and
   perform the at least one operation associated with the at least one entity upon successful validation of the information about the at least one entity.

13. The constraint management system as claimed in claim 8, wherein the plurality of constraints comprises at least one of uniqueness constraints, a relationship constraints, and a value constraints.

14. The constraint management system as claimed in claim 8, wherein the information about the at least one entity comprises properties associated with the at least one entity.

15. A computer program product (CPP) for classifier based constraint management, wherein the CPP comprises:
   a computer executable program code recorded on a computer readable non-transitory storage medium, wherein said computer executable program code when executed causing the actions including:
   creating a constraint graph database comprising a plurality of constraint classes associated with a plurality of Application program interfaces (APIs), wherein each constraint class of the plurality of constraint classes comprises a plurality of constraints associated with at least one API from the plurality of APIs to access the plurality of constraints;
   receiving a request to perform at least one operation associated with at least one entity, wherein the request comprises information about the at least one entity to constraint the at least one operation;
   determining at least one constraint class from the plurality of constraint classes based on the information about the at least one entity to perform the at least one operation;
   invoking the at least one API from the plurality of APIs based on the at least one constraint class to access the plurality of constraints associated with the at least one constraint class; and
   performing the at least one operation associated with the at least one entity based on the plurality of constraints associated with the at least one constraint class and the information about the at least one entity.

16. The CPP as claimed in claim 15, wherein the at least one operation associated with the at least one entity comprises at least one of a create operation to create the at least one entity, an update operation to update the at least one entity, a delete operation to delete the at least one entity, a configure operation to configure the at least one entity, an apply operation to the at least one entity, a commit operation to commit the at least one entity, and a rollback operation to roll back the at least one entity.

17. The CPP as claimed in claim 15, wherein determining the at least one constraint class from the plurality of constraint classes based on the information about the at least one entity to perform the at least one operation comprises:
   generating an entity configuration file based on the information about the at least one entity to perform the at least one operation, wherein the entity configuration file comprising a constraint type, a constraint field, and a constraint scope; and
   determining the at least one constraint class from the plurality of constraint classes based on the entity configuration file.

18. The CPP as claimed in claim 17, wherein the entity configuration file further comprises a constraint name, a constraint type, a constraint when, a constraint expression, and constraint data.

19. The CPP as claimed in claim 15, wherein performing the at least one operation associated with the at least one entity based on the plurality of constraints associated with the at least one constraint class comprises:
   creating constraint specification based on the plurality of constraints associated with the at least one constraint class;
   invoking at least one constraint handler corresponding to the constraint specification to perform the one or more operation, wherein the at least one constraint handler comprises at least one of a uniqueness constraint handler, a relationship constraint handler, and a value constraint handler;
   creating at least one object corresponding to the at least one operation using the at least one constraint handler;
   validating the information about the at least one entity by applying the constraint specification on the at least one object corresponding to the at least one operation; and
   performing the at least one operation associated with the at least one entity upon successful validation of the information about the at least one entity.

20. The CPP as claimed in claim 15, wherein the plurality of constraints comprises at least one of uniqueness constraints, a relationship constraints, and a value constraints.

21. The CPP as claimed in claim 15, wherein the information about the at least one entity comprises properties associated with the at least one entity.

* * * * *